United States Patent
Biedermann et al.

(10) Patent No.: US 9,291,508 B1
(45) Date of Patent: Mar. 22, 2016

(54) LIGHT-PULSE ATOM INTERFEROMETRIC DEVICE

(71) Applicant: Sandia Corporation, Albuquerque, NM (US)

(72) Inventors: Grant Biedermann, Albuquerque, NM (US); Hayden James Evans McGuinness, Albuquerque, NM (US); Akash Rakholia, Albuquerque, NC (US); Yuan-Yu Jau, Albuquerque, NM (US); Peter Schwindt, Albuquerque, NM (US); David R. Wheeler, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 71 days.

(21) Appl. No.: 14/208,259

(22) Filed: Mar. 13, 2014

Related U.S. Application Data (60) Provisional application No. 61/780,089, filed on Mar. 13, 2013.

(51) Int. Cl.
| | |
|---|---|
| *G01N 21/00* | (2006.01) |
| *G01J 9/02* | (2006.01) |
| *G01C 19/58* | (2006.01) |
| G01P 15/093 | (2006.01) |

(52) U.S. Cl.
CPC . *G01J 9/02* (2013.01); *G01C 19/58* (2013.01); *G01P 15/093* (2013.01)

(58) Field of Classification Search
CPC .............................. G01C 19/58; G01P 15/093
See application file for complete search history.

(56) References Cited

U.S. PATENT DOCUMENTS

| | | | | |
|---|---|---|---|---|
| 8,212,556 | B1* | 7/2012 | Schwindt et al. | G01R 33/26 324/301 |
| 8,405,021 | B2* | 3/2013 | Anderson et al. | G21K 1/006 250/251 |
| 8,941,053 | B1* | 1/2015 | Biedermann et al. | G21K 1/006 250/251 |
| 9,086,429 | B1* | 7/2015 | Biedermann et al. | G01P 15/093 |
| 2009/0272887 | A1* | 11/2009 | Fatemi et al. | H05H 3/04 250/251 |
| 2014/0022534 | A1* | 1/2014 | Strabley et al. | G01P 21/00 356/72 |
| 2015/0090033 | A1* | 4/2015 | Budker et al. | G01C 19/58 73/504.05 |

OTHER PUBLICATIONS

Canuel et al., "Six-Axis Inertial Sensor Using Cold-Atom Interferometry," Physical Review Letters 97 (2006) 010402.
Durfee, D.S. et al, "Long-Term Stability of an Area-Reversible Atom-Interferometer Sagnac Gyroscope," Physical Review Letters 97 (2006) 240801.

(Continued)

*Primary Examiner* — Kara E Geisel
*Assistant Examiner* — Shawn Decenzo
(74) *Attorney, Agent, or Firm* — Martin I. Finston (57) ABSTRACT

An atomic interferometric device useful, e.g., for measuring acceleration or rotation is provided. The device comprises at least one vapor cell containing a Raman-active chemical species, an optical system, and at least one detector. The optical system is conformed to implement a Raman pulse interferometer in which Raman transitions are stimulated in a warm vapor of the Raman-active chemical species. The detector is conformed to detect changes in the populations of different internal states of atoms that have been irradiated by the optical system.

22 Claims, 5 Drawing Sheets

(56) References Cited

OTHER PUBLICATIONS

Griger, R. et al., "Detecting inertial effects with airborne matter-wave interferometry," Nature Communications, 2, 474 (2001) 020401.
Kasevich, M. and Chu, S. "Atomic Interferometry Using Stimulated Raman Transitions," Physical Review Letters 67 (Jul. 8, 1991) 181-184.
McGuinness, H.J. et al., "High data-rate atom interferometer for measuring acceleration", Applied Physics Letters 100 (2012) 011106.
Peters, A. et al., "Precision atom interferometry," Phil. Trans. R. Soc. Lond. A 355 (1997) 2223-2233.
Rosenberry, M. et al., "Radiation trapping in rubidium optical pumping at low buffer-gas pressures", Physical Review A, 75 (2007) 023401.

* cited by examiner

LIGHT-PULSE ATOM INTERFEROMETRIC DEVICE

CROSS-REFERENCE TO RELATED APPLICATIONS

This application claims priority to U.S. Provisional Patent Application No. 61/780,089, filed on Mar. 13, 2014, entitled "LIGHT-PULSE ATOM INTERFEROMETRIC DEVICE". The entirety of this application is incorporated herein by reference.

STATEMENT OF GOVERNMENT INTEREST

This invention was developed under Contract DE-AC04-94AL85000 between Sandia Corporation and the U.S. Department of Energy. The U.S. Government has certain rights in this invention.

TECHNICAL FIELD

This invention relates to atomic interferometry and more particularly to light-pulse atom interferometers and their uses in gyroscopes and accelerometers.

ART BACKGROUND

Atomic interferometry is a known technique with applications in gyroscopes and accelerometers, as well as in other instruments for sensing and metrology. Typical atomic interferometers use a laser cooled magneto-optical trap to provide a population of atoms having a long coherence time. Although useful, such instruments are burdened by bulky laser and ultra-high vacuum systems that prohibit compact packaging. Hence, there remains a need for an atomic interferometer that can serve as the sensing element in gyroscopes, accelerometers, and the like, and that can be packaged within a compact volume.

SUMMARY OF THE INVENTION

We have developed such an atomic interferometer. Our interferometer dispenses with the bulky laser-cooling and ultra-high vacuum system because it operates on a population of atoms in a warm atomic vapor.

In an embodiment, our invention comprises at least one vapor cell containing a Raman-active chemical species, an optical system, and at least one detector. The optical system is conformed to implement a Raman pulse interferometer in which Raman transitions are stimulated in a warm vapor of the Raman-active chemical species. The detector is conformed to detect changes in the populations of different internal states of atoms that have been irradiated by the optical system.

A further embodiment comprises at least two detectors associated with the vapor cell, wherein one of the detectors is conformed to measure uniaxial acceleration and the other detector is conformed to measure uniaxial rotation.

A further embodiment comprises three vapor cells as described above, a respective optical system as described above associated with each vapor cell, and a pair of detectors as described above associated with each vapor cell. The three vapor cells are respectively oriented on three mutually perpendicular axes.

In another aspect, the invention is embodied in a method for making inertial measurements. The method comprises irradiating a warm atomic vapor with a sequence of laser pulses that are adapted to stimulate Raman or single-photon transitions in atoms of the warm atomic vapor and thereby to populate a metastable optically excited state; and detecting changes in the population of the metastable optically excited state.

BRIEF DESCRIPTION OF THE DRAWINGS

FIG. 4 is a conceptual illustration of the process of velocity selection according to an implementation of the current invention. FIG. 4 has two views, respectively labeled "a" and "b".

FIG. 5 is a graphical illustration of the performance believed possible from an implementation of the current invention. FIG. 5 has two views respectively labeled "a" and "b". View a represents the results of a numerical simulation. View b represents the results of experimental measurements.

DESCRIPTION OF AN EXEMPLARY EMBODIMENT OF THE INVENTION

The present invention operates by known principles of atomic interferometry, whereby selected atoms are placed in a coherent superposition of different internal states, which oscillate as each atom simultaneously traverses two possible paths between common initial and final points in phase space. At the final point, the two paths interfere. Phase differences between the two paths induced by acceleration or rotation are manifested as shifts in the relative populations of the different internal atomic states, as revealed by a state-selective detector such as a fluorescence or laser-absorption detector.

More specifically, a stimulated Raman transition entangles momentum states (which are external) with spin states (which are internal) so that the atoms in the respective arms of the interferometer are in different momentum-spin states. The first pulse of a so-called "π/2-π-π/2" sequence of optical pulses splits the atomic phase trajectories into the two interferometric "arms" by exciting some atoms from a lower to a higher hyperfine level of the atomic ground state by means of a Raman transition in which photonic recoil induces a corresponding momentum state. (The laser that induces the Raman transition is detuned by a small increment matched to a designated Doppler shift, so as to select for a particular narrow range of initial momenta.) The second pulse exchanges the internal states relative to the external states (or vice versa) so that the two arms will converge. Depending on its phase, the third pulse places the atom in the upper or lower hyperfine state for subsequent detection. Sensing of acceleration or rotation is possible because these conditions cause different phase shifts in the different arms of the interferometer.

It should be understood that the preceding discussion is directed to atomic Raman transitions for purposes of illustration only, and not by way of limitation. Raman-active molecules that exhibit appropriate transitions may also be useful in this context, and are not excluded from the scope of the present invention. Accordingly, references to an atomic vapor or a warm atomic vapor should be understood to include molecular vapors as well as other systems such as nanostructures comprised of many atoms and possessing optical resonances between quantum states that are coherent with one another over the duration of the interferometer.

As the term is used herein, any atomic or molecular species is "Raman-active" if it exhibits at least one stimulated Raman transition or any transition between two states coherent with one another over the duration of the interferometer Contrary to the teachings of the prior art, we have found that a Raman pulse interferometer can be successfully operated using a warm atomic vapor as the Raman-active medium. As the term is used herein, a "warm" atomic vapor is any atomic vapor that is not laser-cooled, i.e., at a temperature greater than $10^{-3}$K.

It should be noted in this regard that useful operation is possible not only at cryogenic temperatures, but also at non-cryogenic temperatures, i.e. temperatures above 123K, and even at room temperature, i.e. 20 C, and above. Generally, atomic interferometers of the kind we have developed will operate at room temperature (20 C) or above. Indeed, our exemplary embodiment provides one example in which it is even advantageous to heat the Raman-active element above room temperature.

In our exemplary embodiment, the Raman-active atomic species is rubidium-87 vapor in an evacuated, sealed cell at a temperature of, e.g., 70 C. It should be understood, however, that any of various atomic (and possibly molecular) species may be used, provided only that they provide suitable optical transitions. For example, one possible alternative to atomic rubidium is atomic cesium.

In the exemplary embodiment, the suitable transitions are provided by a Raman-active three-level system having suitable transition energies. However, any metastable optical transition will suffice in principle, and therefore there are many possible alternatives to Raman-active systems. The only requisites are a coherence time of the metastable states exceeding the coherence time of the interferometer, an optical wavelength for providing good sensitivity, and a technique for preparing the atoms or molecules in one of the two states and then detecting how many atoms made the transition. Thus, although the exemplary embodiment implements a Raman pulse interferometer, other embodiments may implement, e.g., a single-photon pulse interferometer.

Figure 1:
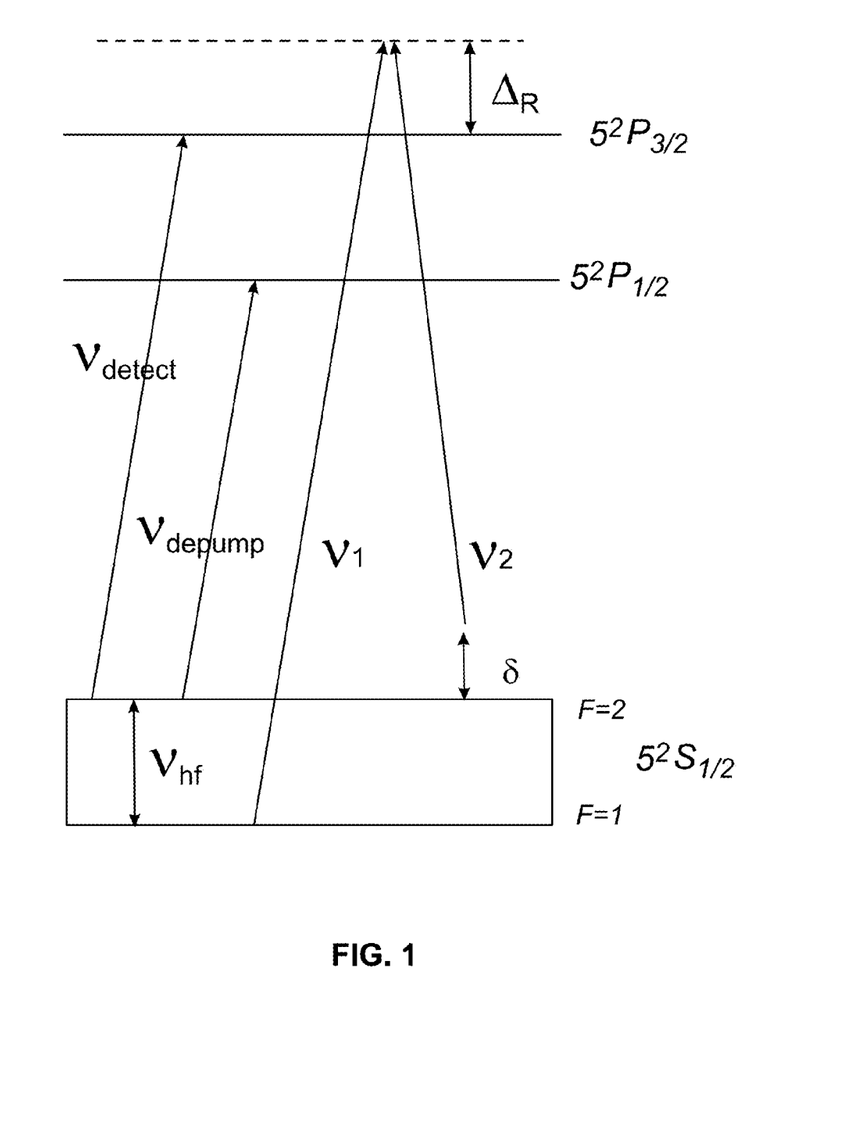
FIG. 1 provides an atomic energy-level diagram of rubidium-87.

FIG. 1 provides an atomic energy-level diagram of rubidium-87, illustrating among other things a hyperfine splitting F=1, F=2 of the atomic ground state. As seen in the figure, a depump pulse, identified in the figure by its frequency $\nu_{depump}$, is used to initially depopulate the F=2 state by way of excitation to the state labeled $5^2P_{1/2}$ in the figure.

The F=2 state is then populated by the first π/2 pulse via a Raman transition. The Raman transition is stimulated by the combination of two optical frequencies (identified in the figure by $\nu_1$ and $\nu_2$) that counterpropagate through the vapor cell. The frequency $\nu_1$ excites the atom to a virtual state that is detuned from the $5^2P_{3/2}$ state by a frequency offset $\Delta_R$. The frequency $\nu_2$ causes the transition to terminate in the F=2 state. The frequency $\nu_2$ is detuned from the F=2 state by a frequency offset δ.

The frequency offset $\Delta_R$ is an intentional detuning that along with the intensity of the light controls the frequency of oscillation between the superposed atomic states at a rate defined as $\Omega_R$. The frequency offset δ corresponds to a Doppler shift that is specified so as to select for a population of atoms characterized by a particular narrow range of initial momenta with a Doppler broadening roughly equivalent to $\Omega_R$.

The counterpropagating Raman beams are pulsed together a total of three times to make each reading. As noted above, the first π/2 pulse excites the F=1 atomic population to a superposition state that is ideally equal parts in F=1 and F=2, the latter of which is the product of an internal F=2 state with an external momentum state induced by photonic recoil. The π pulse, which is twice the duration of the π/2 pulses, exchanges the internal states relative to the external states. Depending on its phase, the second π/2 pulse places the atoms in a varying superposition of the F=1 or F=2 state, the population of which can then be detected using the probe pulse. The respective final-state populations vary in proportion to 1−cos Δϕ, where Δϕ is the phase difference that has accumulated between the respective paths in phase space. As will be seen, this phase difference is sensitive to linear acceleration and to rotation.

The probe pulse, identified in the figure by its frequency $\nu_{detect}$, is used to detect the post-interferometer population of atoms in the F=2 state via absorption or fluorescent emission. In other implementations, of course, the F=1 population may alternatively be detected. It should also be noted that other types of detectors, such as ionization detectors, may alternatively be used.

Figure 2:
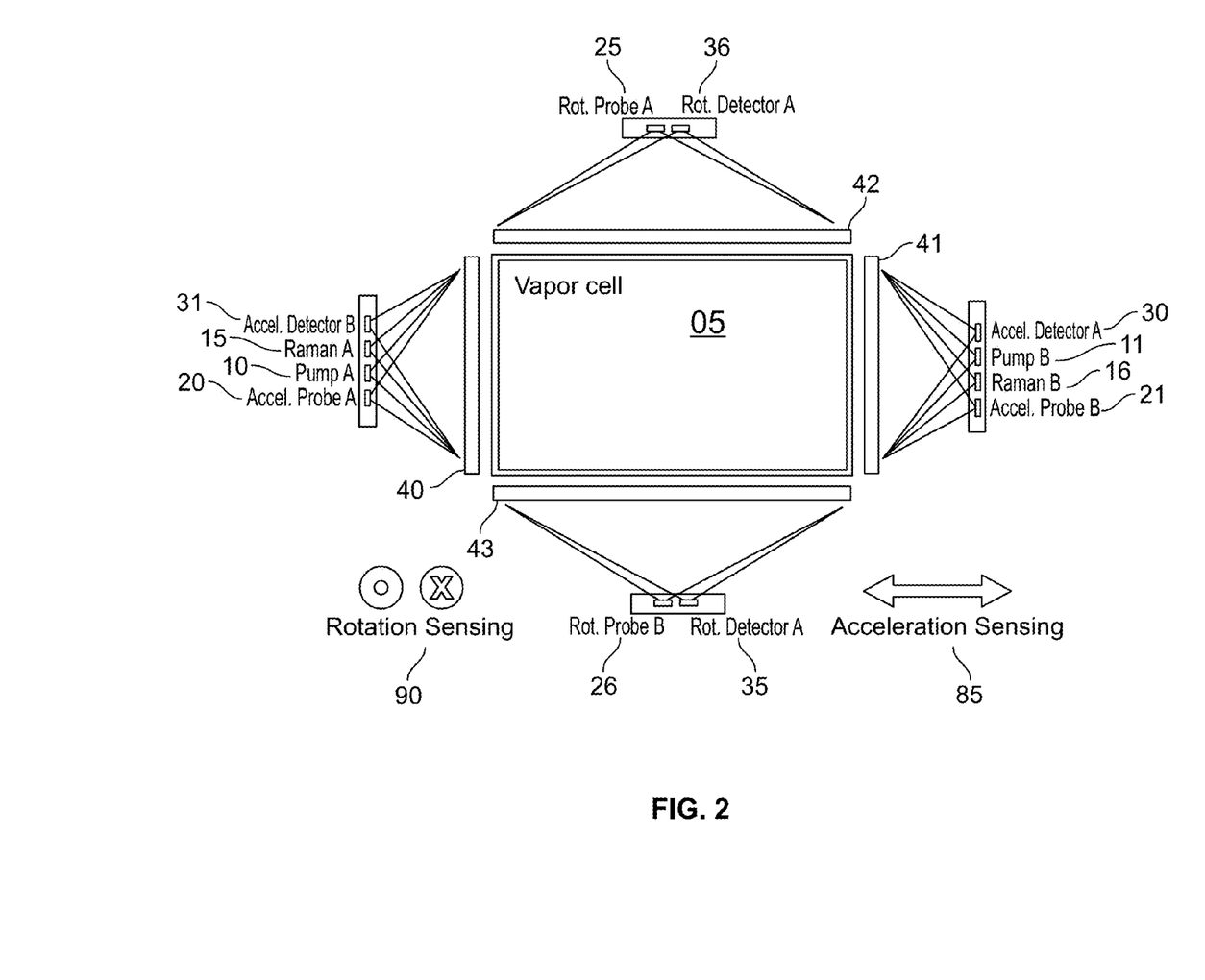
FIG. 2 provides a schematic diagram, not to scale, of one vapor cell of an atomic interferometer sensing device according to an implementation of the current invention that measures only acceleration.

FIG. 2 provides a schematic diagram, not to scale, of one vapor cell 05 of an atomic interferometer sensing device, including the optical system, optical pulse sources, and detectors associated with that cell. It should be understood that the system shown in FIG. 2 is meant to be illustrative only, and not limiting. In particular, it will be understood that any of various alternative arrangements of optical elements and/or of detectors may be adopted without deviating from the general principles described here.

Turning now to FIG. 2, it will be seen that pump laser diode 10 ("Pump A"), Raman laser diode 15 ("Raman A"), and acceleration probe laser diode 20 ("Accel. Probe A") are shown as emitting into a cone of light that in the figure view propagates from left to right. Likewise, pump laser diode 11 ("Pump B"), Raman laser diode 16 ("Raman B"), and acceleration probe laser diode 21 ("Accel. Probe B") are shown as emitting into a cone of light that in the figure view propagates from right to left. Rotation probe laser diode 25 ("Rot. Probe A") is shown as emitting into a cone of light that in the figure view propagates from top to bottom, and rotation probe laser diode 26 ("Rot. Probe B") is shown as emitting into a cone of light that in the figure view propagates from bottom to top.

Figure 4:
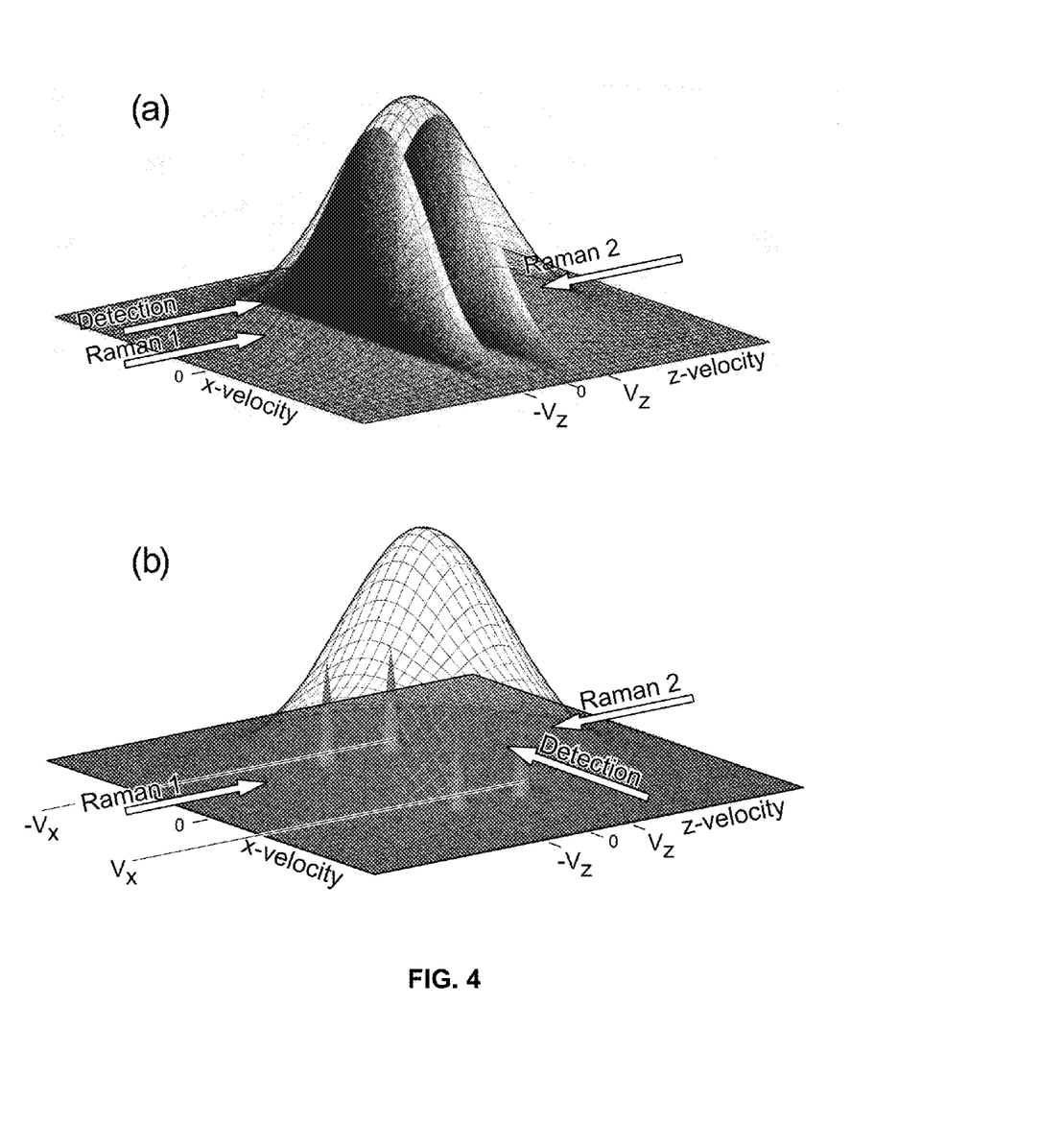

It should be noted in this regard that a single pump laser would be sufficient. However, the use of two pump lasers can as much as double the pumping efficiency. Similarly, a single acceleration probe laser would be sufficient. However, two counterpropagating acceleration probe beams, tuned to slightly different wavelengths, can be used to simultaneously probe two different velocity classes within the atomic population corresponding to two interferometers. Although a single rotation probe laser would be sufficient, two counterpropagating rotation probe beams, tuned to slightly different wavelengths, can likewise be used to simultaneously probe two different velocity classes within the atomic population corresponding to two interferometers. The data read out from such a counterpropagating pair of interferometers can be combined in such a way as to reduce noise by rejecting background fluctuations and drift. Such an approach is explained in further detail below, with reference to FIG. 4. This is an example of how multiple detectors can be used, per axis, to reduce noise and/or drift in the interferometer measurement.

Diffractive optical element (DOE) 40 is for beam-shaping and polarization control. As seen in the figure, DOE 40 captures and collimates the light from laser diodes 10, 15, and 20 and transmits the resulting beams from left to right through cell 05. Likewise, beam-shaping and polarization control is provided by DOE 41, which captures and collimates the light from laser diodes 11, 16, and 21 and transmits the resulting beams from right to left through cell 05. DOEs 42 and 43 similarly provide beam-shaping and polarization control for laser diodes 25 and 26, respectively. As seen in the figure, DOE 42 captures and collimates the light from laser diode 25 and transmits the resulting beam from top to bottom through cell 05. DOE 43 likewise captures and collimates the light from laser diode 26 and transmits the resulting beam from bottom to top through cell 05.

With further reference to the figure, DOE 41 captures the collimated light beam from acceleration probe diode 20 and focusses it onto acceleration detector 30 ("Accel. Detector A"). DOE 40 likewise captures the collimated light beam from acceleration-probe laser diode 21 and focusses it onto acceleration detector 31 ("Accel. Detector B"). Similarly, DOE 43 captures the collimated light beam from rotation-probe laser diode 25 and focusses it onto rotation detector 35 ("Rot. Detector A"), and DOE 42 captures the collimated light beam from rotation-probe laser diode 26 and focusses it onto rotation detector 36 ("Rot. Detector B").

Accordingly, it will be understood that the cell as illustrated has one acceleration sensing axis 85 that is oriented left-to-right in the figure view, and that the cell has one rotation-sensing axis 90 oriented perpendicular to the figure plane. We refer to such a unit as "uniaxial" because it has only one acceleration sensing axis. Three such uniaxial units, arranged to be mutually perpendicular, e.g. by orienting their respective acceleration sensing axes in mutually perpendicular directions, can provide sensing in all six of the rigid body degrees of freedom.

With further reference to FIG. 2, it will be seen that acceleration is measured by probing the atoms with the beams from laser diodes 20 and 21, which are collinear with the Raman beams from laser diodes 15 and 16. It will further be seen that rotation is measured by probing the atoms with the beams from laser diodes 25 and 26, which propagate in directions orthogonal to the Raman beams in order to target a velocity class of atoms with a substantial velocity that is also orthogonal to the Raman beams.

Pump laser diodes 10 and 11 are, e.g., high-power GaAs VCSELs emitting near 795 nm. Raman laser diodes 15 and 16 are, e.g., DFB laser diodes each sourcing a tapered amplifier laser diode emitting near 780 nm. Acceleration probe laser diodes 20 and 21 are, e.g., GaAs VCSELs each emitting near 780 nm. Rotation probe laser diodes 25 and 26 are, e.g., GaAs VCSELs each emitting near 780 nm. When a pair of probe lasers are used to target different velocity classes within the atomic population, an optical frequency difference between the respective probe beams of about 20 MHz is typical.

In an example in which we demonstrated acceleration sensing but not rotation sensing, the operative wavelengths and optical powers were: Pump, 795 nm at 10 mW; Raman, 780 nm at 30 mW average power; acceleration probe, 780 nm at 0.1 mW.

Figure 3:
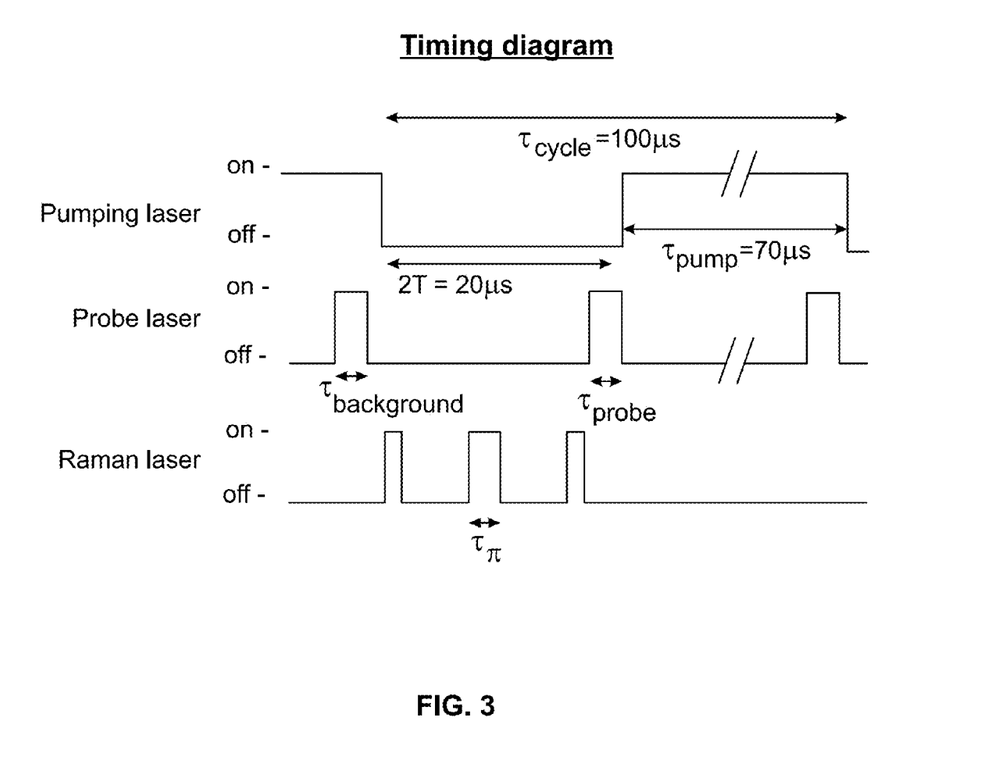
FIG. 3 is a timing diagram that illustrates the timing of the various laser pulses used in an illustrative implementation of the current invention.

In an implementation as illustrated in FIG. 3, the pump pulse is 70 us in duration and precedes the Raman and probe pulses. Following the pump pulse is the background probe pulse which is 5 μs in duration. Following the background probe pulse are the three Raman pulses. The Raman pulse widths were 200 ns for the π/2 pulses and were 400 ns for the π pulses. The time T between the first π/2 pulse and the π pulse, and likewise between the π pulse and the second π/2 pulse, is 10 μs. Following the Raman pulses is the detection probe pulse. The detection probe pulse is 5 us in duration. The pulse sequence then repeats immediately for a cycle repetition rate of 10 kHz.

Vapor cell 05 will typically be from one to several centimeters in length, and from five to 20 millimeters in lateral dimensions. In an example, the vapor cell is 100 mm×40 mm×20 mm. A column 40 mm long and 20 mm in diameter was used for our experimental demonstration. The cell had a spin anti-relaxation coating of tris(N,N-dimethylamino)octadecylsilane, with which a spin lifetime of 12.9 ms was achieved. Such a coating has a low outgassing rate as compared with paraffin, and it allows a vacuum of $10^{-8}$ Torr. We believe that the coating allowed a spin polarization of 90% of the atoms in the state F=1.

The use of a spin coating is not essential, but we found in our experimental example that it is effective to improve performance by reducing background signal. It is a known effect that the spin polarization of an atom, as well as the coherence and inertial information, is lost upon adsorption and subsequent desorption from a surface where, among other things, large electric fields can drive spin-flip transitions. A known technique for preserving spin polarization and coherence is the use of a covalently bound wax-like surface coating that blocks atoms from surface interactions. One consequence is an effective extension of the time duration within which the atom can interact with and be polarized by the pumping beam.

The cell is desirably maintained at a vacuum level below $10^{-4}$ Torr. Above approximately this level, collisions of the coherent rubidium atoms with background gas will decohere the interferometer on a 20-μs timescale. It is known that the background of helium in the atmosphere at a partial pressure of about $10^{-3}$ Torr, permeates the glass cell and leads to an unacceptable level of background collisions. We have found that the cell can be operated without pumping for about two days before requiring evacuation with a vacuum pump. The use of a low helium permeability glass can circumvent this requirement, or in at least some cases may permit operation with vacuum pumping at a speed of at most 5 liters/s.

As alluded to earlier, the probability P that upon detection, an atom is in the excited state is given by $P=(1/2)(1-\cos \Delta\phi)$, where $\Delta\phi = \vec{k} \cdot (\vec{a} - 2(\vec{v} \times \vec{\Omega}))T^2$, $\vec{a}$ is the acceleration, $\vec{\Omega}$ is the rotation, $\vec{k}$ is the effective wavevector of the pulsed Raman light, and $\vec{v}$ is the center velocity of the atoms. Acceleration is measured by probing the atoms with the probe beam that is collinear with the Raman beams, and rotation is measured by probing with a beam that is directed orthogonally to the Raman beam. The rotation probe targets a velocity class of atoms with a substantial velocity orthogonal to the Raman beams so to maximize the term $\vec{v} \times \vec{\Omega}$.

As briefly noted above, multiple velocity classes can be excited and separately detected. For example, using a single retro-reflected Raman laser, it is possible to excite two classes symmetrically around zero velocity, so that the respective classes have equal and opposite responses to acceleration. Such an approach can at least partially cancel drift and shot-to-shot noise. Such an approach is illustrated in FIGS. 4a and 4b, which are discussed below. As will be discussed in greater detail below, a similar approach can be applied to the gyroscopic, i.e., rotational measurement, axis.

FIGS. 4a and 4b illustrate the concept of velocity selection. The two Gaussian shapes visible in FIG. 4a represent two relatively cold velocity classes respectively centered at $\pm v_z$ that have been selected using the Doppler shift as explained above, and subsequently detected. The magnitude of $v_z$ is limited by the Maxwell-Boltzmann velocity distribution to roughly 180 m/s at 70 C.

Shown superposed over the selected distributions in FIG. 4a is a Gaussian, outlined in a two-dimensional mesh, that represents the entire distribution. As illustrated in FIG. 4b, sub-populations having large velocities orthogonal to the Raman laser can be selected from each of the classes of FIG. 4a. This selection is made using a second detection beam to retrieve rotation information.

For rotational measurement, it is advantageous to sum the signals from two symmetrically placed velocity classes. More specifically, it will be seen in FIG. 4b that for the velocity class $V_{+x}$, a pair of sub-populations with transverse velocity components of $+/-V_z$ have been selected, and for the velocity class $V_{-x}$, a pair of sub-populations with transverse velocity components of $+/-V_z$ have likewise been selected. The two respective $V_{+x}$ sub-populations have identical rotation sensitivity, but equal and opposite acceleration sensitivity. Hence it is possible, by summing the signals obtained from those sub-populations, to null the acceleration sensitivity while doubling the rotation signal. The analogous operation performed on the two respective $V_{-x}$ sub-populations yields equal and opposite rotation sensitivity. Differencing the resulting $V_{+x}$ and $V_{-x}$ signals can be performed so as to reject background fluctuations and drift while preserving the rotation signal.

It will be understood that the interrogation time T is the time between successive Raman pulses. The interrogation time is limited to one-half the time it takes for the majority of thermal atoms to collide with the cell wall, which erases all prior inertial information. In a centimeter-scale device, this time is on the order of tens of microseconds. To compensate for the loss of sensitivity that results from such a short interrogation time, it is desirable to drive up the signal-to-noise ratio (SNR). In our approach, the SNR is increased by using the large density of atoms available in a warm vapor, which in our example is about $2 \times 10^{12}/cm^3$ at 70 C.

More specifically, for acceleration measurements, we select a sample centered about a velocity $\vec{v}_z$ such that $\vec{k} \cdot \vec{v}_z = \delta$. With respect to $\vec{k}$, the velocity of the atoms obeys a one-dimensional Maxwell-Boltzmann distribution, in which the peak density of atoms occurs around zero velocity and falls off from that peak in a Gaussian fashion.

The number of excited atoms is limited by the Fourier transform of the Raman pulse and is proportional to intensity. By employing a peak Raman beam intensity of 4 W/cm$^2$ and $\Delta_R = 1$ GHz, it is believed possible to probe about 0.2 percent of the atoms in the Raman beam volume. Although only a small fraction of the vapor atoms will typically participate in the measurement, the number of atoms available (in principle on the order of $10^{14}$/s for a 4 cm$^3$ volume and a repetition rate of 10 kHz) is vastly greater than the number of available atoms in cold-atom interferometers adapted for applications in dynamic environments.

Figure 5:
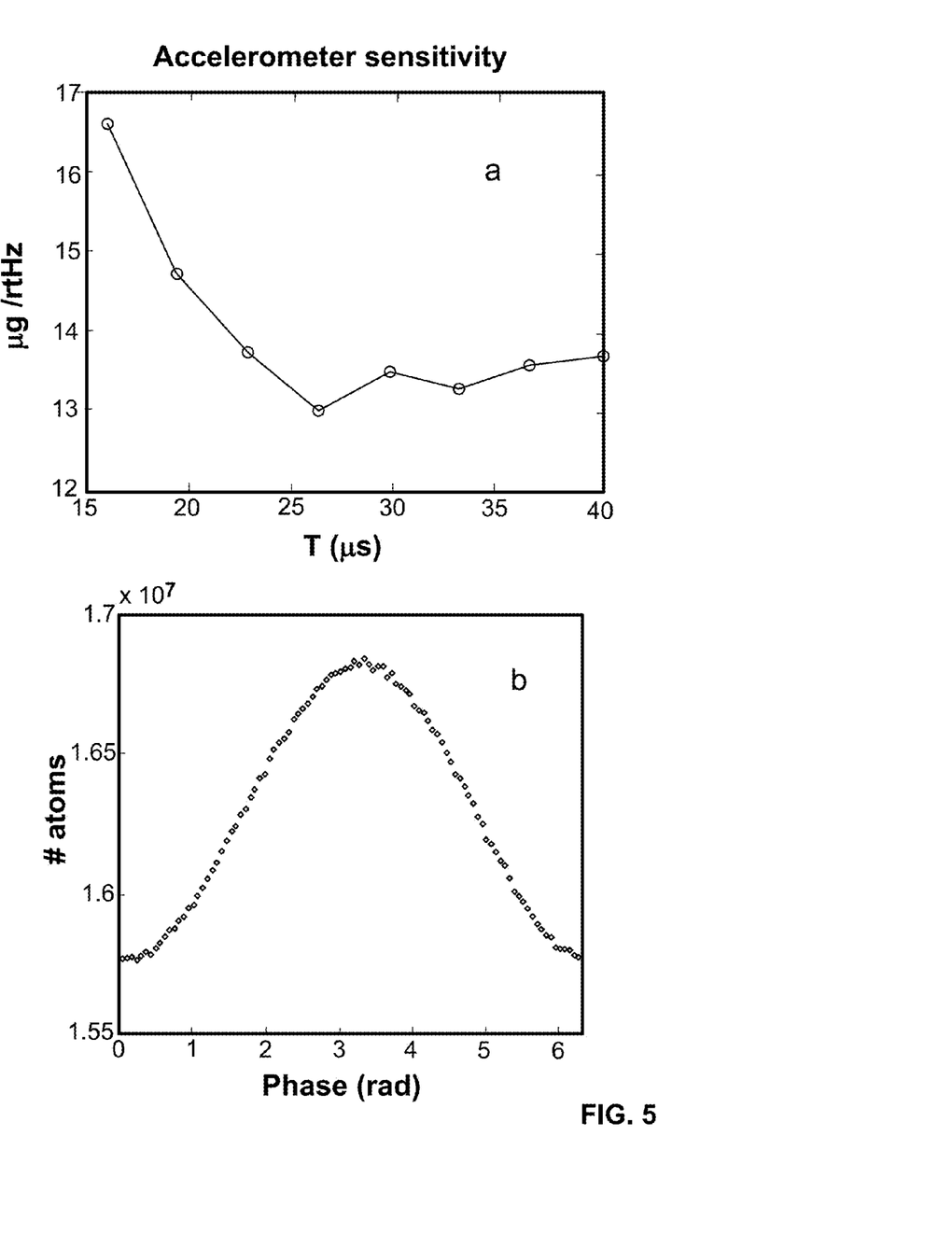

By a numerical simulation whose results are shown in FIG. 5a, we estimated that the fundamental noise limit at a data rate of about 10 kHz for an accelerometer based on a rubidium-87 vapor cell 4 cm$^3$ in volume is about $13 \times 10^{-6}$ g/$\sqrt{Hz}$ where g=9.8 m/s$^2$. A similar simulation yields a fundamental noise limit of about $40 \times 10^{-3}$ deg/$\sqrt{hy}$ for a gyroscope. The simulation assumed that only atoms in the $m_F = 0$ magnetic sublevel state contribute to the signal whereas states for which $m_F \neq 0$ contribute to background noise, and it assumed a temperature of 70 C.

FIG. 5b is a signal recorded from an experimental prototype interferometer constructed substantially as described above and operated with a thermal vapor of rubidium-87 at a temperature of 50 C. Represented in the figure is a scan performed with an interrogation time of 10 μs and a Raman π-pulse duration of 0.350 μs, and averaged 1000 times. The relative phase of the two Raman frequencies was varied between the interferometer pulses so as to provide a scan of a full period of an interference fringe. The period of the curve represents a shift of 400 g.

The principles as described above are susceptible of numerous variations, extensions, and improvements that may be implemented without deviating from the scope and spirit of the present invention. For example, the cell may be configured to increase optical intensity by supporting a multiple-pass Raman beam. That can be achieved, e.g., by placing a reflector at each end of the cell to create a standing wave cavity, or by placing the cell within one arm of an optical ring cavity. One benefit that this might provide is to substantially reduce the power requirements on the Raman laser. If in turn the power requirements are reduced, then two, three, or even more distinct, simultaneously resonant optical frequencies can be introduced into the Raman laser beam so that as many different velocity classes can be addressed. That, in turn, can be exploited to increase the signal or to increase sensitivity.

In another example, each of one or more probe lasers emits a probe beam that contains two, three, or more distinct optical frequencies. Each of the respective frequency channels in effect creates a different interferometer by resonating with a different velocity class of atoms via the Doppler shift. At the detector, the three frequency channels are heterodyned, i.e. mixed, on a photodiode. The strength of the mixed and detected signal can be read out directly as an indication of the population differences among the respective interferometers. More specifically, there would be a distinct beat frequency in the detected signal for each respective velocity class. When combined with the common-mode noise-rejection technique described earlier, in which a difference is taken between signals from counterpropagating populations, this approach can provide significant signal enhancement while operating with relatively few probe beams.

In another example, one or more probe frequencies are configured to measure interferometer population on resonance, while one or more further probe frequencies are configured to simultaneously measure signal background off resonance. Such an approach is useful when the background contains noise or drift due, e.g., to optical pumping from interferometer processes or to cell temperature. To first order, the signal can be improved in such cases by simply subtracting the background. For even more improvement, a predetermined map could be used to correct the raw signal in view of the background measurements. Such a map may be provided, for example, by a look-up table or a transfer function. Measurements from auxiliary sensors of various kinds could also be used, e.g. as input to a similar type of map, for correcting the raw signal. Still further, a compendium of previous background measurements could be called upon to make an optimal Bayesian estimation of current signal value based on existing temporal signatures.

In yet another example, one or more auxiliary sensors, i.e. sensors external to the vapor cell, are used to provide complementary information to help overcome deficiencies in bandwidth, drift compensation, and/or noise rejection. Examples of sensors that could be suitable for such a purpose include thermistors for temperature measurement, MEMS sensors for measuring magnetic field or temperature, and MEMS sensors or fiber-optic gyroscopes for inertial measurements. Complementary magnetic field and temperature measurements could be included, e.g., in a Kalman filter to predict known sensitivities of the interferometer to magnetic field and sensitivities of the probe absorption to temperature-driven vapor density. Information about rotation and acceleration from the auxiliary inertial sensors could provide a complementary response to inertial motion yielding improved performance when merged with the interferometer output.

What is claimed is:

1. Apparatus comprising an atomic interferometer of the kind in which an optical system stimulates Raman or single-photon transitions in an atomic population of a chemical species that has a metastable optically excited state and in which changes in the populations of different internal states of atoms of the chemical species are detected, wherein the atomic interferometer comprises:
   a vapor cell;
   a vapor source situated within the vapor cell and conformed to provide a warm atomic vapor of the chemical species;
   at least one Raman laser controllable so as to irradiate the warm atomic vapor with optical pulses that stimulate Raman or single-photon transitions in atoms of the warm atomic vapor, thereby populating a metastable optically excited state; and
   at least one detection system conformed to detect changes in the population of the metastable optically excited state.

2. Apparatus of claim 1, wherein at least two Raman lasers are controllable so as to irradiate the warm atomic vapor with coincident optical pulses that stimulate Raman transitions in the atoms of the warm atomic vapor.

3. The apparatus of claim 2, further comprising a controller adapted to tune at least one of the Raman lasers so that the Raman transitions are stimulated in a selected velocity class within the atomic population.

4. The apparatus of claim 3, wherein:
   the detection system comprises one or more probe lasers, each arranged to transmit an optical beam through the atomic vapor, and at least one photodetector arranged to detect changes in the interaction of one or more of the probe beams with the atomic vapor; and
   the controller is adapted to tune at least one of the probe beams so that the changes in the population of the metastable optically excited state are detected in a selected velocity class within the atomic population.

5. The apparatus of claim 4, wherein the controller is adapted to tune one or more of the Raman lasers and one or more of the probe lasers to multiple wavelengths so that the Raman transitions are concurrently stimulated in two or more selected velocity classes within the atomic population and the changes in the population of the metastable optically excited state are detected in the two or more selected velocity classes.

6. The apparatus of claim 1, wherein:
   the Raman laser or lasers are tuned or tunable so as to stimulate the Raman or single-photon transitions in at least one selected velocity class within the atomic population characterized by an average velocity component $V_z$ along an acceleration-measurement axis; and
   the Raman laser or lasers are arranged to irradiate the atomic vapor on a path that has mirror symmetry along the acceleration-measurement axis so that two velocity classes are selected, said classes respectively characterized by the average velocity components $V_z$ and $-V_z$.

7. The apparatus of claim 6, wherein:
   the detection system comprises one or more acceleration probe lasers arranged to emit optical pulses directed parallel to the acceleration-measurement axis and one or more acceleration photodetectors arranged to detect said optical pulses after they have interacted with the atomic vapor;
   the detection system is arranged to separately detect changes in the population of the metastable optically excited state in each of the two velocity classes, leading to respective acceleration photodetector output signals; and
   the apparatus further comprises a processing circuit arranged to combine the respective acceleration photodetector output signals so as to enhance said signals and to derive an acceleration measurement at least in part from said signals.

8. The apparatus of claim 7, wherein:
   the detection system further comprises one or more rotation probe lasers arranged to emit optical pulses directed transverse to the acceleration-measurement axis and one or more rotation photodetectors arranged to detect said optical pulses after they have interacted with the atomic vapor;
   the rotation probe laser or lasers are tuned or tunable such that changes in the population of the metastable optically excited state are detected in at least some of the velocity subclasses $(V_z,V_x)$, $(V_z,-X_x)$, $(-V_z,V_x)$, and $(-V_z,-V_x)$, wherein said velocity subclasses are selected from the $V_z$ and $-V_z$ velocity classes and are further characterized by a velocity component $V_x$ or $-V_x$ directed transverse to the acceleration-measurement axis;
   the detection system is arranged to separately detect changes in the population of the metastable optically excited state in each of at least two of the velocity subclasses, leading to respective rotation photodetector output signals; and
   the processing circuit is further arranged to combine the respective rotation photodetector output signals so as to enhance said signals and to derive a rotation measurement at least in part from said signals.

9. The apparatus of claim 1, comprising at least two detectors associated with the vapor cell, wherein one of the detectors is conformed to measure uniaxial acceleration and the other detector is conformed to measure uniaxial rotation.

10. The apparatus of claim 1, comprising three vapor cells, wherein:
   a vapor source is situated within each vapor cell;
   at least two Raman lasers are arranged to irradiate a warm atomic vapor within each vapor cell;
   each vapor cell has a detection system comprising at least one detector conformed to measure uniaxial acceleration and at least one detector conformed to measure uniaxial rotation; and
   the three vapor cells are respectively oriented on three mutually perpendicular axes.

11. The apparatus of claim 1, further comprising:
   at least one auxiliary sensor situated externally to the vapor cell and selected from the group consisting of magnetic field sensors, temperature sensors, acceleration sensors, and rotation sensors; and
   a processing circuit adapted to combine signal output from the detection system with signal output from at least one said auxiliary sensor and to provide acceleration measurements and/or rotation measurements from the combined signal outputs.

12. The apparatus of claim 1, further comprising a spin anti-relaxation coating applied to an inner surface of the vapor cell.

13. The apparatus of claim 12, wherein the spin anti-relaxation coating comprises an aminosilane.

14. The apparatus of claim 12, wherein the spin anti-relaxation coating comprises tris(N,N-dimethylamino)octadecylsilane.

15. The apparatus of claim 1, further comprising an optical cavity arranged so that each pulse from the Raman laser or lasers passes multiple times through the warm atomic vapor.

16. The apparatus of claim 1, wherein the vapor cell formed of a glass having helium permeability low enough to permit steady-state operation without vacuum pumping or with vacuum pumping at a speed of at most 5 liters/s.

17. The apparatus of claim 1, wherein:
the detection system is conformed to produce an on-resonance output signal responsive to Raman pulses tuned to populate the metastable optically excited state;
the detection system is further conformed to produce an off-resonance output signal responsive to laser pulses tuned to be ineffective for populating the metastable optically excited state; and
the apparatus further comprises a processing circuit adapted to perform background subtraction in which the off-resonance output signal is at least partially removed from the on-resonance output signal.

18. The apparatus of claim 17, wherein the optical system is arranged such that the on-resonance Raman pulses and the off-resonance laser pulses are concurrent.

19. A method for making inertial measurements, comprising:
irradiating a warm atomic vapor with a sequence of laser pulses that are adapted to stimulate Raman or single-photon transitions in atoms of the warm atomic vapor and thereby to populate a metastable optically excited state; and
detecting changes in the population of the metastable optically excited state.

20. The method of claim 19, wherein at least two Raman lasers are controlled so as to irradiate the warm atomic vapor with coincident optical pulses that stimulate Raman transitions in the atoms of the warm atomic vapor.

21. The method of claim 19, further comprising transmitting pulses of light through the atomic vapor from one or more probe lasers, wherein the probe pulses are tuned to select for at least one particular velocity class within the atomic population, and wherein the detecting step comprises detecting the probe pulses.

22. The method of claim 19, further comprising:
transmitting pulses of light from one or more acceleration probe lasers through the atomic vapor in a direction parallel to the acceleration-measurement axis; and
transmitting pulses of light from one or more rotation probe lasers through the atomic vapor in a direction transverse to the acceleration-measurement axis;
and wherein the detecting step comprises detecting the acceleration probe optical pulses and the rotation probe optical pulses after said pulses have interacted with the atomic vapor.

* * * * *